(12) United States Patent
Liu et al.

(10) Patent No.: US 12,728,857 B2
(45) Date of Patent: Sep. 8, 2026

(54) ACCELERATION CONTROL TO PREVENT COLLISIONS

(71) Applicant: TOYOTA RESEARCH INSTITUTE, INC., Los Altos, CA (US)

(72) Inventors: Yiting Liu, Los Altos, CA (US); Hirofumi Yamamoto, Los Altos, CA (US); Chen Bao, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 22 days.

(21) Appl. No.: 18/919,338

(22) Filed: Oct. 17, 2024

(65) Prior Publication Data

US 2025/0033642 A1 Jan. 30, 2025

Related U.S. Application Data

(63) Continuation of application No. 17/696,727, filed on Mar. 16, 2022, now Pat. No. 12,162,490.

(51) Int. Cl.
*B60W 30/18* (2012.01)
*B60W 60/00* (2020.01)

(52) U.S. Cl.
CPC .. *B60W 30/18027* (2013.01); *B60W 60/0015* (2020.02); *B60W 2520/10* (2013.01);
(Continued)

(58) Field of Classification Search
CPC ......... B60W 60/0015; B60W 2520/10; B60W 2520/105; B60W 2552/05;
(Continued)

(56) References Cited

U.S. PATENT DOCUMENTS 10,976,737 B2 4/2021 Boniske et al.
2010/0250087 A1* 9/2010 Sauter ................ B60W 30/143 701/93

(Continued)

FOREIGN PATENT DOCUMENTS

DE 102013226599 A1 6/2015
JP 6950546 B2 8/2019

OTHER PUBLICATIONS

Tom Krisher, "5 reasons why autonomous cars aren't coming anytime soon," https://apnews.com/article/ap-top-news-mi-state-wire-phoenix-pa-state-wire-pittsburgh-b67a0d6b6413406fb4121553cdf0b95a, Feb. 4, 2019.

(Continued)

*Primary Examiner* — Khoi H Tran
*Assistant Examiner* — Tristan J Greiner
(74) *Attorney, Agent, or Firm* — Seyfarth Shaw LLP

(57) ABSTRACT

A method for controlling the acceleration rate of a vehicle based on the vehicle's location includes determining, via one or more sensors, that the vehicle is at a first location and reducing the vehicle's initial target acceleration rate to a first adjusted target acceleration rate in response to the location satisfying a first location condition. Subsequently, the method includes determining that the vehicle has reached a second location and increasing the first adjusted target acceleration rate to a second adjusted target acceleration rate in accordance with determining that the vehicle has reached the second location. This method can be applied to vehicles operating in autonomous or semi-autonomous modes.

17 Claims, 6 Drawing Sheets

(52) U.S. Cl.
CPC ... *B60W 2520/105* (2013.01); *B60W 2552/05* (2020.02); *B60W 2552/45* (2020.02); *B60W 2554/00* (2020.02); *B60W 2720/106* (2013.01)

(58) Field of Classification Search
CPC ......... B60W 2552/45; B60W 2554/00; B60W 2720/106; B60W 30/143; B60W 30/18154; B60W 2552/53
See application file for complete search history.

(56) References Cited

U.S. PATENT DOCUMENTS

| | | | | |
|---|---|---|---|---|
| 2015/0284000 | A1* | 10/2015 | Hayakawa ............ | B60W 30/08<br>701/70 |
| 2017/0261991 | A1* | 9/2017 | Raghu .................. | G05D 1/0217 |
| 2017/0297575 | A1 | 10/2017 | Das et al. | |
| 2018/0022350 | A1* | 1/2018 | McNew .............. | B60W 30/182<br>701/23 |
| 2018/0326982 | A1* | 11/2018 | Paris ................. | B60W 30/0956 |
| 2020/0043343 | A1 | 2/2020 | Branson et al. | |
| 2020/0361488 | A1 | 11/2020 | Miura | |
| 2021/0094547 | A1 | 4/2021 | Garcia et al. | |
| 2021/0149389 | A1 | 5/2021 | Weslosky et al. | |
| 2021/0331711 | A1 | 10/2021 | Voigt | |

OTHER PUBLICATIONS

Shu et al., "Autonomous Driving at Intersections: A Critical-Turning-Point Approach for left turns," arXiv:2003.02409, Mar. 5, 2020.

* cited by examiner

ACCELERATION CONTROL TO PREVENT COLLISIONS

CROSS-REFERENCE TO RELATED APPLICATION

The present application is a continuation of U.S. patent application Ser. No. 17/696,727, filed on Mar. 16, 2022, and titled "ACCELERATION CONTROL TO PREVENT COLLISIONS," the disclosure of which is expressly incorporated by reference in its entirety.

BACKGROUND

Field

Certain aspects of the present disclosure generally relate to controlling vehicle acceleration and, more particularly, to a system and method for controlling the vehicle acceleration when the vehicle moves from a stopped position.

Background

A conventional autonomous vehicle may be configured to stop at a crosswalk and then drive through the crosswalk when safe. In some examples, the autonomous vehicle may determine that it is safe to drive through the crosswalk when a pedestrian is not within a range of the autonomous vehicle. In some such examples, when proceeding to drive through the crosswalk, the autonomous vehicle may accelerate at a rate that may be equal to a rate provided by a human driver. Still, in some cases, one or more vehicle sensors may fail to identify a pedestrian in the crosswalk and the autonomous vehicle may collide with the pedestrian as the autonomous vehicle drives through the crosswalk. In such cases, it may be desirable to reduce a possibility of a collision with a pedestrian by reducing an acceleration rate when the autonomous vehicle moves from a standstill.

SUMMARY

In one aspect of the present disclosure, a method for controlling an acceleration rate of a vehicle includes monitoring a first current speed and a first acceleration rate of the vehicle based on the vehicle moving from a standstill. The method further includes setting an initial target acceleration rate to an adjusted target acceleration rate based on the first acceleration rate satisfying a first acceleration adjustment condition and the first current speed satisfying a second acceleration adjustment condition. The method still further includes monitoring a second acceleration rate and a second current acceleration rate of the vehicle based on setting the initial target acceleration rate to the adjusted target acceleration rate. The method also includes setting the adjusted target acceleration rate to the initial target acceleration rate based on the second acceleration rate satisfying a first target acceleration condition or the second current speed satisfying a second target acceleration condition.

Another aspect of the present disclosure is directed to an apparatus including means for monitoring a first current speed and a first acceleration rate of the vehicle based on the vehicle moving from a standstill. The apparatus further includes means for setting an initial target acceleration rate to an adjusted target acceleration rate based on the first acceleration rate satisfying a first acceleration adjustment condition and the first current speed satisfying a second acceleration adjustment condition. The apparatus still further includes means for monitoring a second acceleration rate and a second current acceleration rate of the vehicle based on setting the initial target acceleration rate to the adjusted target acceleration rate. The apparatus also includes means for setting the adjusted target acceleration rate to the initial target acceleration rate based on the second acceleration rate satisfying a first target acceleration condition or the second current speed satisfying a second target acceleration condition.

In another aspect of the present disclosure, a non-transitory computer-readable medium with non-transitory program code recorded thereon is disclosed. The program code is executed by a processor and includes program code to monitor a first current speed and a first acceleration rate of the vehicle based on the vehicle moving from a standstill. The program code further includes program code to set an initial target acceleration rate to an adjusted target acceleration rate based on the first acceleration rate satisfying a first acceleration adjustment condition and the first current speed satisfying a second acceleration adjustment condition. The program code still further includes program code to monitor a second acceleration rate and a second current acceleration rate of the vehicle based on setting the initial target acceleration rate to the adjusted target acceleration rate. The program code also includes program code to set the adjusted target acceleration rate to the initial target acceleration rate based on the second acceleration rate satisfying a first target acceleration condition or the second current speed satisfying a second target acceleration condition.

Another aspect of the present disclosure is directed to an apparatus having a processor, and a memory coupled with the processor and storing instructions operable, when executed by the processor, to cause the apparatus to monitor a first current speed and a first acceleration rate of the vehicle based on the vehicle moving from a standstill. Execution of the instructions further cause the apparatus to set an initial target acceleration rate to an adjusted target acceleration rate based on the first acceleration rate satisfying a first acceleration adjustment condition and the first current speed satisfying a second acceleration adjustment condition. Execution of the instructions also cause the apparatus to monitor a second acceleration rate and a second current acceleration rate of the vehicle based on setting the initial target acceleration rate to the adjusted target acceleration rate. Execution of the instructions further cause the apparatus to set the adjusted target acceleration rate to the initial target acceleration rate based on the second acceleration rate satisfying a first target acceleration condition or the second current speed satisfying a second target acceleration condition.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
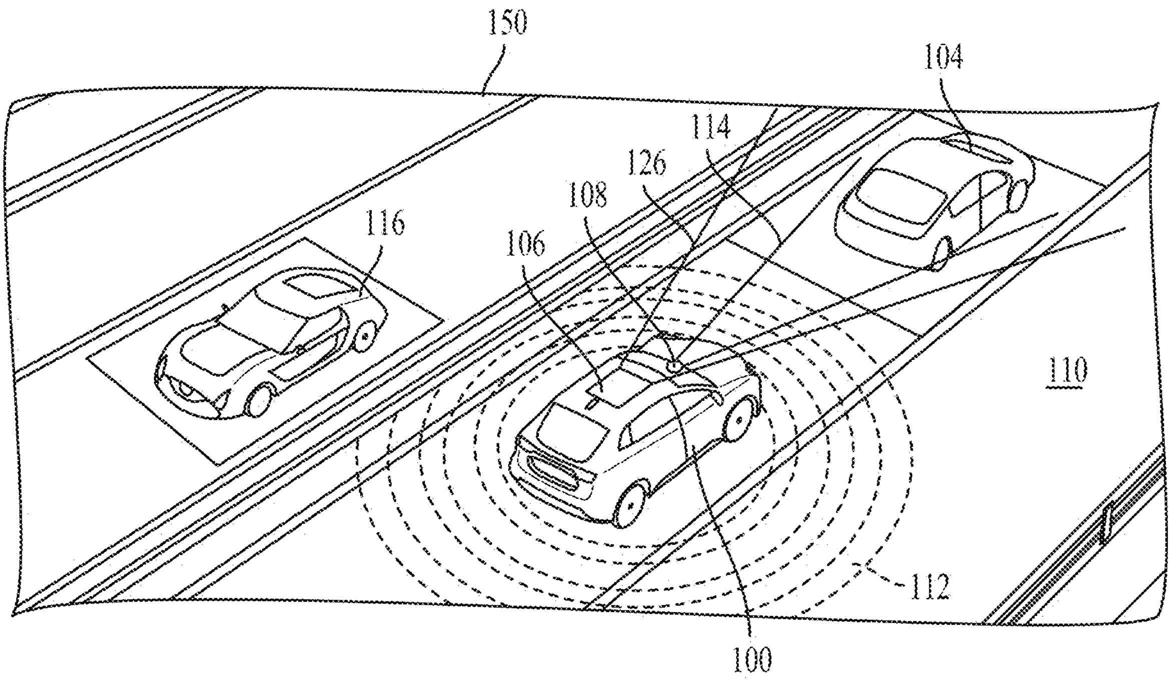
FIGS. 1A and 1B are diagrams illustrating examples of a vehicle, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

In some cases, a human may operate a vehicle in a manual mode, where the human controls the basic operations of the vehicle. The basic operations may include, for example, acceleration, deceleration, and trajectory. In some examples, during the manual mode, the human may stop the vehicle at an intersection and then drive through the intersection when the driver determines it is safe. In some such examples, the intersection may include a designated crossing area, such as a crosswalk, for pedestrians to cross the road. The human may control the vehicle to stop before the crosswalk. Once the vehicle has stopped, the human may check if a pedestrian, or another object, such as an animal, is near the vehicle. Upon determining that a pedestrian is not near the vehicle, the human may cause the vehicle to accelerate and proceed through the crosswalk.

For ease of explanation, in the present application, a designated crossing area will be referred to as a crosswalk. Additionally, for ease of explanation, in the present application, an autonomous vehicle may be referred to as a vehicle. Aspects of the present disclosure are not limited to a vehicle stopping at a crosswalk and may be applied to other areas that include pedestrians and/or other objects that may collide with a vehicle.

As discussed, a conventional autonomous vehicle may be configured to stop at a crosswalk and then drive through the crosswalk when safe. In some examples, the autonomous vehicle may determine that it is safe to drive through the crosswalk when a pedestrian is not within a range of the vehicle. In some such examples, one or more sensors associated with the vehicle may determine that a pedestrian is not within a range of the vehicle. The autonomous vehicle may then accelerate through the crosswalk at a rate that is equal to an acceleration rate provided by a human driver.

Still, in some cases, when a vehicle is at a standstill, one or more vehicle sensors may fail to identify a pedestrian, or another object, near the vehicle. In some such examples, the vehicle may collide with the pedestrian as the vehicle moves from the standstill. In such examples, it may be desirable to reduce a possibility of a collision with a pedestrian by reducing an acceleration rate when the vehicle is driving through the crosswalk.

Various aspects of the present disclosure are directed to adjusting an acceleration rate of an autonomous vehicle. Some aspects more specifically relate to reducing an acceleration rate of an autonomous vehicle when the autonomous vehicle moves from a standstill and one or more conditions are satisfied. The reduced acceleration rate may return to a desired acceleration rate after one or more conditions are satisfied. In some examples, the vehicle may be at a standstill at an intersection or a crosswalk.

Particular aspects of the subject matter described in this disclosure may be implemented to realize one or more of the following potential advantages. In some examples, by limiting (e.g., reducing) the acceleration rate of an autonomous vehicle that is moving from a standstill, a probability of a collision with a dynamic object, such as a pedestrian, may be reduced.

FIG. 1A is a diagram illustrating an example of a vehicle 100 in an environment 150, in accordance with various aspects of the present disclosure. In the example of FIG. 1A, the vehicle 100 may be an autonomous vehicle, a semi-autonomous vehicle, or a non-autonomous vehicle. As shown in FIG. 1A, the vehicle 100 may be traveling on a road 110. A first vehicle 104 may be ahead of the vehicle 100 and a second vehicle 116 may be adjacent to the ego vehicle 100. In this example, the vehicle 100 may include a 2D camera 108, such as a 2D red-green-blue (RGB) camera, and a LIDAR sensor 106. Other sensors, such as RADAR and/or ultrasound, are also contemplated. Additionally, or alternatively, although not shown in FIG. 1A, the vehicle 100 may include one or more additional sensors, such as a camera, a RADAR sensor, and/or a LIDAR sensor, integrated with the vehicle in one or more locations, such as within one or more storage locations (e.g., a trunk). Additionally, or alternatively, although not shown in FIG. 1A, the vehicle 100 may include one or more force measuring sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream 124 may include a 3D cloud point of objects in a second field of view, such as a forward facing field of view.

The 2D image captured by the 2D camera includes a 2D image of the first vehicle 104, as the first vehicle 104 is in the 2D camera's 108 field of view 114. As is known to those of skill in the art, a LIDAR sensor 106 uses laser light to sense the shape, size, and position of objects in an environment. The LIDAR sensor 106 may vertically and horizontally scan the environment. In the current example, the artificial neural network (e.g., autonomous driving system) of the vehicle 100 may extract height and/or depth features from the first output stream. In some examples, an autonomous driving system of the vehicle 100 may also extract height and/or depth features from the second output stream.

The information obtained from the sensors 106, 108 may be used to evaluate a driving environment. In some examples, the information obtained from the sensors 106, 108 may identify whether the vehicle 100 is at an interaction or a crosswalk. Additionally, or alternatively, the information obtained from the sensors 106, 108 may identify whether one or more dynamic objects, such as pedestrians, are near the vehicle 100.

Figure 1B:
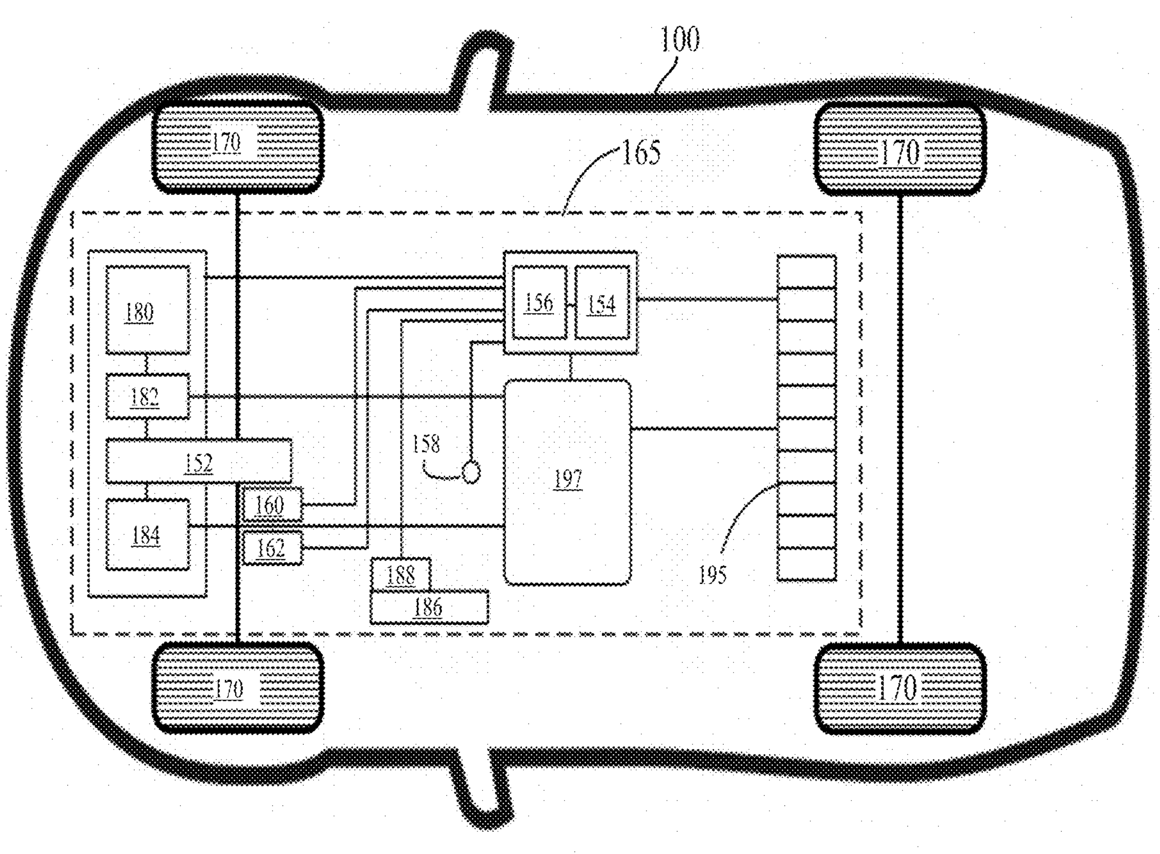

FIG. 1B is a diagram illustrating an example the vehicle 100 in which various aspects of the present disclosure may be implemented. It should be understood that various aspects of the present disclosure may be directed to an autonomous vehicle. The autonomous vehicle may include be an internal combustion engine (ICE) vehicle, fully electric vehicle (EVs), or another type of vehicle. The vehicle 100 may include drive force unit 165 and wheels 170. The drive force unit 165 may include an engine 180, motor generators (MGs) 182 and 184, a battery 195, an inverter 197, a brake pedal 186, a brake pedal sensor 188, a transmission 152, a memory 154, an electronic control unit (ECU) 156, a shifter 158, a speed sensor 160, and an accelerometer 162.

The engine 180 primarily drives the wheels 170. The engine 180 can be an ICE that combusts fuel, such as gasoline, ethanol, diesel, biofuel, or other types of fuels which are suitable for combustion. The torque output by the engine 180 is received by the transmission 152. MGs 182 and 184 can also output torque to the transmission 152. The engine 180 and MGs 182 and 184 may be coupled through a planetary gear (not shown in FIG. 1B). The transmission 152 delivers an applied torque to one or more of the wheels 170. The torque output by engine 180 does not directly translate into the applied torque to the one or more wheels 170.

MGs 182 and 184 can serve as motors which output torque in a drive mode, and can serve as generators to recharge the battery 195 in a regeneration mode. The electric power delivered from or to MGs 182 and 184 passes through the inverter 197 to the battery 195. The brake pedal sensor 188 can detect pressure applied to brake pedal 186, which may further affect the applied torque to wheels 170. The speed sensor 160 is connected to an output shaft of transmission 152 to detect a speed input which is converted into a vehicle speed by ECU 156. The accelerometer 162 is connected to the body of vehicle 100 to detect the actual deceleration of vehicle 100, which corresponds to a deceleration torque.

The transmission 152 may be a transmission suitable for any vehicle. For example, transmission 152 can be an electronically controlled continuously variable transmission (ECVT), which is coupled to engine 180 as well as to MGs 91 and 92. Transmission 20 can deliver torque output from a combination of engine 180 and MGs 91 and 92. The ECU 156 controls the transmission 152, utilizing data stored in memory 154 to determine the applied torque delivered to the wheels 170. For example, ECU 156 may determine that at a certain vehicle speed, engine 180 should provide a fraction of the applied torque to the wheels 170 while one or both of the MGs 182 and 184 provide most of the applied torque. The ECU 156 and transmission 152 can control an engine speed (NE) of engine 180 independently of the vehicle speed (V).

The ECU 156 may include circuitry to control the above aspects of vehicle operation. Additionally, the ECU 156 may include, for example, a microcomputer that includes a one or more processing units (e.g., microprocessors), memory storage (e.g., RAM, ROM, etc.), and I/O devices. The ECU 156 may execute instructions stored in memory to control one or more electrical systems or subsystems in the vehicle. Furthermore, the ECU 156 can include one or more electronic control units such as, for example, an electronic engine control module, a powertrain control module, a transmission control module, a suspension control module, a body control module, and so on. As a further example, electronic control units may control one or more systems and functions such as doors and door locking, lighting, human-machine interfaces, cruise control, telematics, braking systems (e.g., anti-lock braking system (ABS) or electronic stability control (ESC)), or battery management systems, for example. These various control units can be implemented using two or more separate electronic control units, or a single electronic control unit.

The MGs 182 and 184 each may be a permanent magnet type synchronous motor including for example, a rotor with a permanent magnet embedded therein. The MGs 182 and 184 may each be driven by an inverter controlled by a control signal from ECU 156 so as to convert direct current (DC) power from the battery 195 to alternating current (AC) power, and supply the AC power to the MGs 182 and 184. In some examples, a first MG 182 may be driven by electric power generated by a second MG 184. It should be understood that in embodiments where MGs 182 and 184 are DC motors, no inverter is required. The inverter, in conjunction with a converter assembly may also accept power from one or more of the MGs 182 and 184 (e.g., during engine charging), convert this power from AC back to DC, and use this power to charge battery 195 (hence the name, motor generator). The ECU 156 may control the inverter, adjust driving current supplied to the first MG 182, and adjust the current received from the second MG 184 during regenerative coasting and braking.

The battery 195 may be implemented as one or more batteries or other power storage devices including, for example, lead-acid batteries, lithium ion, and nickel batteries, capacitive storage devices, and so on. The battery 195 may also be charged by one or more of the MGs 182 and 184, such as, for example, by regenerative braking or by coasting during which one or more of the MGs 182 and 184 operates as generator. Alternatively (or additionally, the battery 195 can be charged by the first MG 182, for example, when vehicle 100 is in idle (not moving/not in drive). Further still, the battery 195 may be charged by a battery charger (not shown) that receives energy from engine 180. The battery charger may be switched or otherwise controlled to engage/disengage it with battery 195. For example, an alternator or generator may be coupled directly or indirectly to a drive shaft of engine 180 to generate an electrical current as a result of the operation of engine 180. Still other embodiments contemplate the use of one or more additional motor generators to power the rear wheels of the vehicle 100 (e.g., in vehicles equipped with 4-Wheel Drive), or using two rear motor generators, each powering a rear wheel.

The battery 195 may also power other electrical or electronic systems in the vehicle 100. In some examples, the battery 195 can include, for example, one or more batteries, capacitive storage units, or other storage reservoirs suitable for storing electrical energy that can be used to power one or both of the MGs 182 and 184. When the battery 195 is implemented using one or more batteries, the batteries can include, for example, nickel metal hydride batteries, lithium ion batteries, lead acid batteries, nickel cadmium batteries, lithium ion polymer batteries, or other types of batteries.

The vehicle 100 may operate in one of an autonomous mode, a manual mode or a semi-autonomous mode. In the manual mode, a human driver manually operates (e.g., controls) the vehicle 100. In the autonomous mode, an autonomous control system (e.g., autonomous driving system) operates the vehicle 100 without human intervention. In the semi-autonomous mode, the human may operate the vehicle 100, and the autonomous control system may override or assist the human. For example, the autonomous control system may override the human to prevent a collision or to obey one or more traffic rules.

Figure 2:
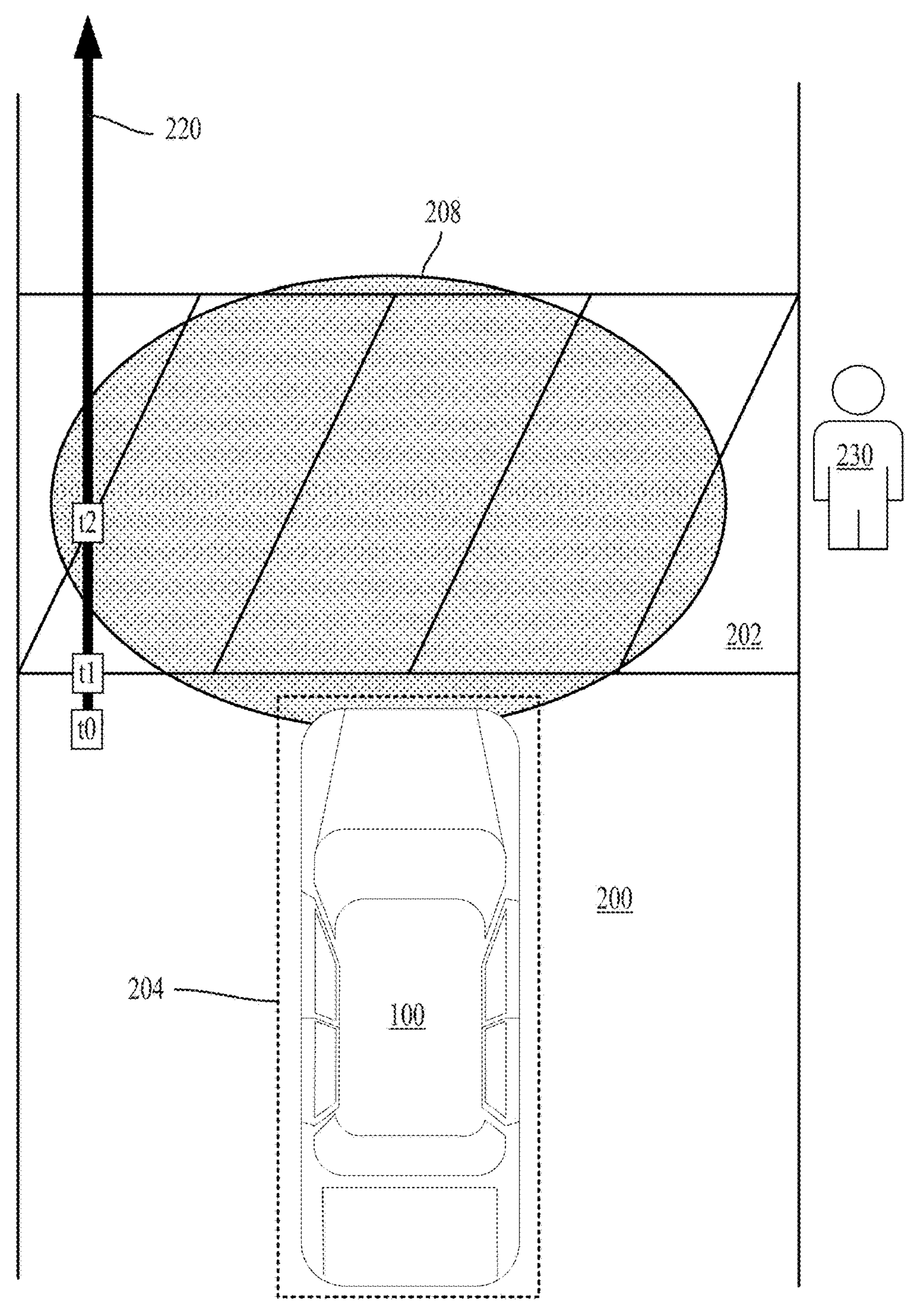
FIG. 2 is a block diagram illustrating a vehicle stopped a crosswalk, in accordance with various aspects of the present disclosure.

FIG. 2 is a block diagram illustrating an example of a vehicle 100 at a standstill, in accordance with various aspects of the present disclosure. In the example of FIG. 2, the vehicle 100 is an example of an autonomous vehicle that may use one or more sensors, such as perception sensors, for sensing a surrounding environment. Additionally, the vehicle 100 may autonomously navigate through the surrounding environment based on information gathered from the one or more sensors. In some examples, the one or more sensors may sense (e.g., identify) a crosswalk 202 prior to the vehicle 100 arriving at a current location 204. In such examples, based on sensing the crosswalk 202, the autonomous driving system of the vehicle 100 may cause the vehicle 100 to come to a standstill at the current location 204 (e.g., behind the crosswalk 202). As discussed, aspects of the present disclosure are not limited to the vehicle 100 stopping at the crosswalk 202. The vehicle 100 may stop at other locations, such as an intersection or another area that requires the vehicle 100 to stop.

In the example of FIG. 2, when stopped at the current location 204, the one or more sensors may determine whether the vehicle 100 may move in the forward direction 220. In some examples, the autonomous driving system may determine that the vehicle 100 may move forward when the one or more sensors do not identify an object, such as a pedestrian 230, within a safety area 208 adjacent to the vehicle 100. Alternatively, the autonomous driving system may determine that the vehicle 100 should remain at the current location 204 based on the one or more sensors identifying an object within the safety area 208 adjacent to the vehicle 100. The safety area 208 may be an area adjacent to the vehicle 100, such as in front of the vehicle 100. Still, the safety area 208 is not limited to the location shown in FIG. 2. The safety area 208 may be defined in one or more other areas that are adjacent to the vehicle 100.

As discussed, in conventional systems, after determining that the vehicle 100 may move in the forward direction 220, the autonomous driving system may cause the vehicle 100 to move in the forward direction 220 at pre-defined acceleration rate, such as an acceleration rate that is equal to an acceleration rate of a human driver. In contrast to conventional systems, in some implementations, the autonomous driving system may limit an acceleration rate of the vehicle 100 when moving in the forward direction 220 from the current location 204. In some examples, the acceleration rate may be limited for a duration of time, a distance, or until one or more acceleration limiting conditions are satisfied.

In some examples, at a time t0, when the vehicle 100 initiates a move from a standstill at the current location 204, the vehicle 100 may accelerate at a target acceleration rate. The vehicle 100 may initiate the move from the standstill by applying throttle to move the vehicle 100 in the forward direction 220 to reach the target acceleration rate. The target acceleration rate may be a value that is desired at time to. The target acceleration rate may differ from an actual acceleration rate of the vehicle 100 at time t0 due to one or more conditions, such as, for example, drag, road conditions, or environmental conditions (e.g., rain, temperature, or snow). In such examples, an actual acceleration rate of the vehicle 100 may not instantaneously reach the target acceleration rate. Rather, when the actual acceleration rate is less than the target accelerate rate, the increases over a period of time to reach the target acceleration rate. Alternatively, when the actual acceleration rate is greater than the target accelerate rate, the decreases over a period of time to reach the target acceleration rate.

The actual acceleration rate at time to may be referred to as the current acceleration rate. Additionally, the target acceleration rate may also be referred to as a commanded acceleration rate. The target acceleration rate may be based on one or more of a user preference, a current environment of the vehicle 100, or a manufacturer default. As an example, the target acceleration rate in a school zone may be less than the target acceleration rate in an empty road. After time t0, the autonomous driving system may determine whether one or more acceleration limiting conditions are satisfied. The acceleration rate may be reduced if the one or more acceleration limiting conditions are satisfied.

In some implementations, the autonomous driving system may determine if a measured acceleration rate satisfies a first acceleration limiting condition and a current speed satisfies a second acceleration limiting condition. The measured acceleration rate may be a target acceleration rate or an actual acceleration rate for a time when the acceleration rate is measured. In some examples, the first acceleration limiting condition is satisfied when the measured acceleration is greater than an acceleration threshold, such as 0.72 $m/s^2$, and the second acceleration limiting condition is satisfied based on the current speed being less than a speed threshold, such as 3.6 km/h. In the example of FIG. 2, the first and second acceleration limiting conditions may be satisfied at time t1. In this example, the autonomous driving system may adjust an initial target acceleration rate to be equal to or less than an adjusted acceleration rate based on the first and second acceleration limiting conditions being satisfied. The initial target acceleration rate is an example of a target acceleration rate that is set when the vehicle 100 moves from a standstill. In some examples, the adjusted target acceleration rate may be 0.7 $m/s^2$. In such examples, an actual acceleration rate of the vehicle 100 may be limited to being equal to or less than the adjusted target acceleration rate. Additionally, because the actual acceleration rate of the vehicle 100 is greater than the acceleration threshold, the actual acceleration rate may reduce over a period of time to reach the adjusted target acceleration rate, which is set to be less than the acceleration threshold.

After adjusting (e.g., limiting) the target acceleration rate, the autonomous driving system may periodically or continuously measure acceleration rate and a current speed of the vehicle 100. The current speed may differ from a previous measured speed, such as a speed at time t0 or time t1, based on the adjustment to the acceleration rate. In some examples, the autonomous driving system may adjust the current target acceleration rate back to an initial target acceleration rate of time to if either a first target acceleration condition or a second target acceleration condition is satisfied. In some examples, the first target acceleration condition may be satisfied if a measured acceleration rate is less than or equal to the acceleration threshold, such as 0.72 $m/s^2$, and the second target acceleration condition may be satisfied if the current speed is greater than the speed threshold, such as 3.6 km/h. In the example of FIG. 2, the target acceleration condition may be satisfied at time t2. In this example, the autonomous driving system may set the current target acceleration rate (e.g., the adjusted target acceleration) back to the initial target acceleration rate based on either the first target acceleration condition or the second target acceleration condition being satisfied.

According to various aspects of the present disclosure, by limiting one or both of the target acceleration rate and the speed between time t1 and time t2, an occupant (e.g., driver) of the vehicle 100 may have sufficient time to override the autonomous driving system if the vehicle 100 is in imminent danger of a collision with an object, such as a pedestrian. In some examples, the occupant may stop the vehicle within 1 meter of an object if the vehicle 100 erroneously moved in the forward direction 220. In the example of FIG. 2, the vehicle 100 may erroneously move in the forward direction 220 when one or more sensors fail to detect an object, such as a pedestrian 230, in the safety area 208. The one or more sensors may fail to detect the object due to sensor failure, occlusion of the object, bad weather, and/or other error causing conditions.

In the example of FIG. 2, the autonomous driving system may continuously monitor a speed and an acceleration vehicle 100 via one or more sensors integrated with the vehicle 100, such that the current speed and the current acceleration may be determined based on the continuous monitoring. In the example of FIG. 2, times t0, t1, and t2 are provided for illustrative purposes and are not limited to corresponding to the locations shown in FIG. 2. Times t0, t1, and t2 may correspond to other locations within the crosswalk 202 or beyond the crosswalk 202.

In some examples, when the vehicle 100 is at a standstill at a current location 204, the autonomous driving system may determine if the vehicle 100 is within a range of an intersection (not shown in FIG. 2) or the crosswalk 202. If the vehicle is not within the range of the intersection or the crosswalk 202, the autonomous driving system may not limit a target acceleration rate of the vehicle 100 when moving in the forward direction 220 from the current location 204.

Figure 3:
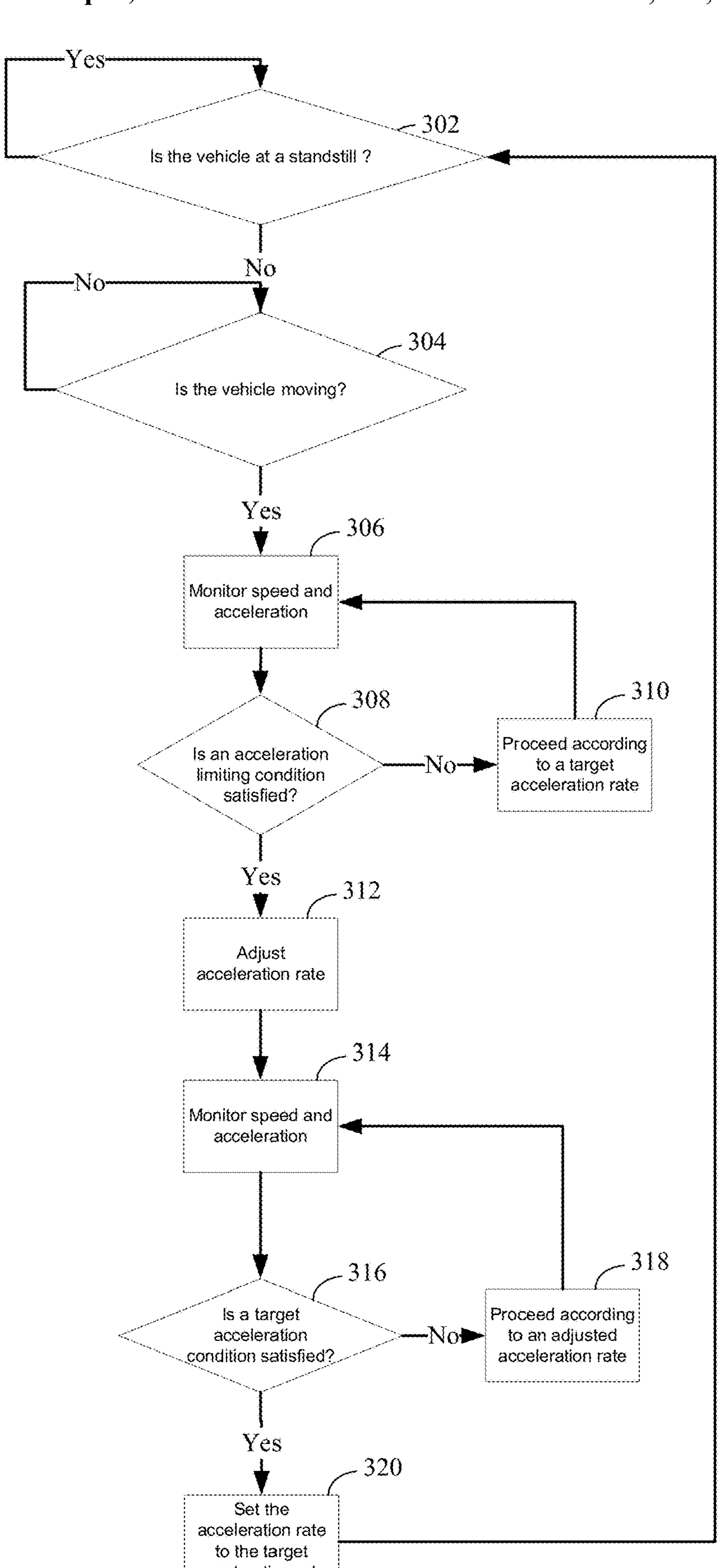
FIG. 3 is a flow diagram illustrating an example of a process for adjusting an acceleration rate of a vehicle, in accordance with various aspects of the present disclosure.

As discussed, aspects of the present disclosure may change an acceleration rate (e.g., acceleration pattern) of an autonomous vehicle that is operating in an autonomous mode when accelerating from a standstill. In some examples, when accelerating from the standstill, the target acceleration rate of the autonomous vehicle may be reduced so that the autonomous vehicle slowly moves (e.g., creeps) forward. The slow acceleration provides an occupant with additional time to take over control of the vehicle before the vehicle collides with an object. FIG. 3 is a flow diagram illustrating an example of a process 300 for adjusting an acceleration rate of a vehicle, in accordance with various aspects of the present disclosure. The process 300 may be performed by one or more components of an autonomous vehicle, such as the vehicle 100 described with reference to FIGS. 1, 2, and 4. In the example of FIG. 3, it is assumed the vehicle 100 is operating in an autonomous mode.

As shown in FIG. 3, at block 302, the process 300 may determine if the vehicle is at a standstill. In some examples, the process 300 determines if the vehicle is at the standstill regardless of a location, such as a crosswalk, intersection, freeway onramp, parking lot, or another type of location. In such examples, the process 300 may proceed to block 304 regardless of the standstill location. In some other examples, at block 302, the process 300 may be limited to determining if the vehicle is at a standstill within a range (e.g., distance) of one or more types of locations, such as a crosswalk or an intersection. In some such examples, the process 300 may only proceed to block 304 if the vehicle is at a standstill at a specific type of location, such as a crosswalk or intersection. The standstill refers to the vehicle being stopped. In most cases, the vehicle may decelerate and come to the standstill based on one or more sensors of the vehicle identifying a stop condition, such as identifying a stop sign, a red light, an intersection, a crosswalk, an object on the road, or another type of stop condition.

If the vehicle is not at the standstill, the process 300 continues to block 302 to determine if the vehicle is at the standstill. Alternatively, if the vehicle is at the standstill, the process 300 determines if the vehicle has moved from the standstill (block 304). As an example, the vehicle may move forward from the standstill by applying the throttle. The process 300 may determine that the vehicle has moved based on information provided from one or more sensors of the vehicle, such as a throttle sensor, a motion sensor, or a location sensor. If the vehicle has not moved from the standstill, the process 300 continues to monitor the vehicle to determine if the vehicle has moved from the standstill (block 302). Alternatively, if the vehicle has moved from the standstill, the process monitors a speed and an acceleration of the vehicle (block 306). The process 300 may monitor the speed and the acceleration based on information provided from one or more sensors of the vehicle, such as a speed sensor or an acceleration sensor.

When moving from the standstill, the vehicle may accelerate at a target acceleration rate. In the example of FIG. 3, based on monitoring the speed and the acceleration (e.g., acceleration rate) of the vehicle, the process may determine if a first acceleration limiting condition and a second acceleration limiting condition are satisfied based on a current speed and a measured acceleration (e.g., target acceleration or actual acceleration) of the vehicle (block 308). In some examples, the first acceleration limiting condition is satisfied based on the measured acceleration being greater than an acceleration threshold, such as 0.72 $m/s^2$, and the second acceleration limiting condition is satisfied based on a current speed being less than a speed threshold, such as 3.6 km/h.

If the first and second acceleration limiting conditions are not satisfied, the process 300 may continue to proceed according to the target acceleration rate (block 310) and continue to monitor the speed and acceleration (block 306). Alternatively, if the first and second acceleration limiting conditions are satisfied, the process 300 may adjust the acceleration rate at block 312. In some examples, the process 300 may adjust the target acceleration rate by limiting the target acceleration rate to be equal to or less than a limited target acceleration rate. In some examples, the limited target acceleration rate may be 0.7 $m/s^2$. After limiting the target acceleration rate, the process 300 may continue to monitor the speed and the acceleration at block 314.

Based on monitoring the speed and the acceleration at block 314, the process 300 may determine whether a first target acceleration condition or a second target acceleration condition is satisfied based on a current speed or a current acceleration (block 316). In some examples, the first target acceleration condition may be satisfied if a measured acceleration is less than or equal to the acceleration threshold, such as 0.72 $m/s^2$, or the second target acceleration condition may be satisfied if a current speed is greater than the speed threshold, such as 3.6 km/h. In the example of FIG. 3, if the target acceleration condition is not satisfied, the process 300 maintains the adjusted target acceleration rate (block 318) and continues to monitor the speed and acceleration (block 314). Alternatively, if the target acceleration condition is satisfied, the process 300 sets the target acceleration rate to an initial target acceleration rate (block 320). The process 300 may then monitor movement of the vehicle to determine whether the vehicle is at a standstill (block 302).

Figure 4:
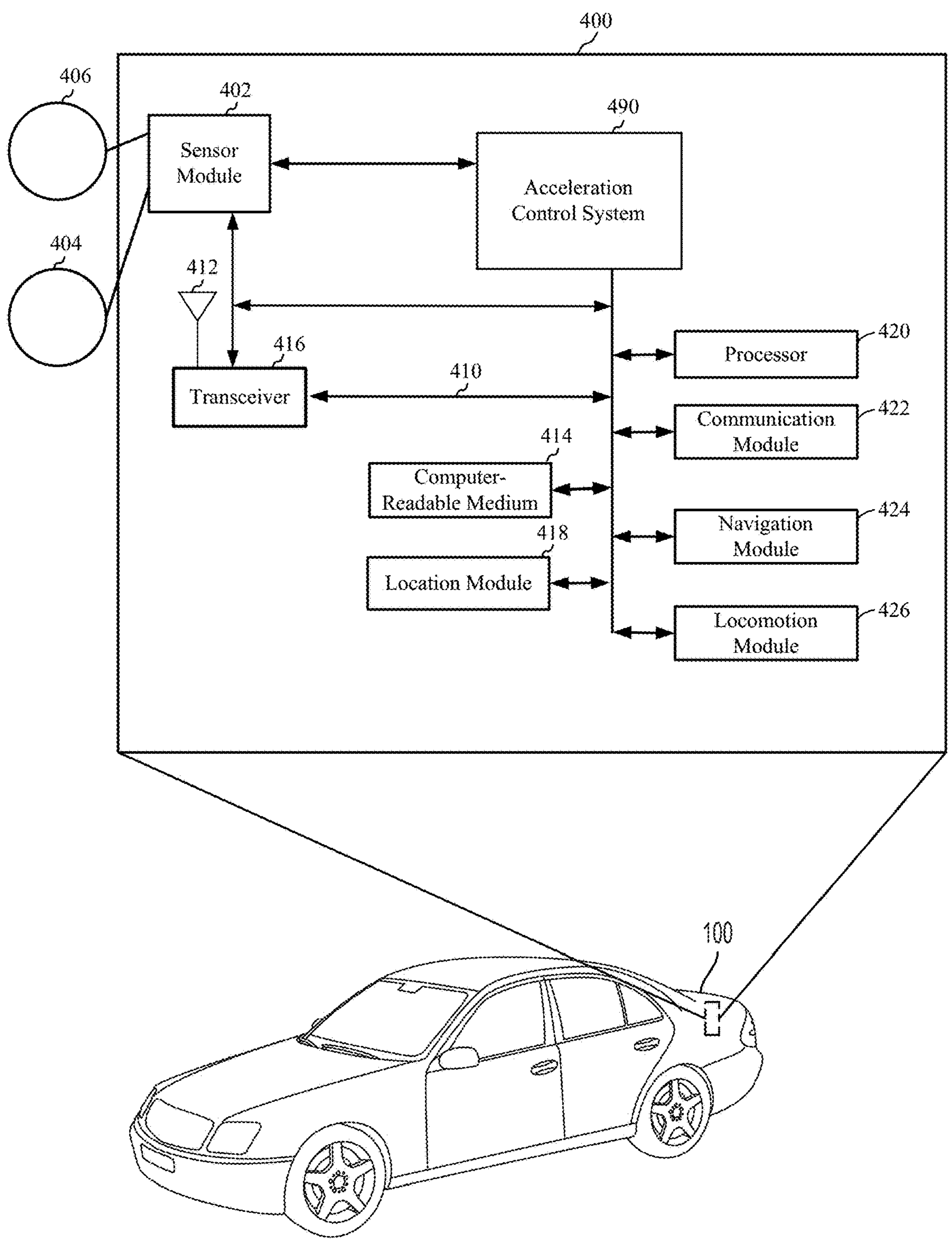
FIG. 4 is a diagram illustrating an example of a hardware implementation for a vehicle control system comprising an acceleration adjustment system, in accordance with aspects of the present disclosure.

FIG. 4 is a diagram illustrating an example of a hardware implementation for a vehicle control system 400, according to aspects of the present disclosure. The vehicle control system 400 may be a component of a vehicle, a robotic device, or other device. For example, as shown in FIG. 4, the vehicle control system 400 is a component of a vehicle 100. Aspects of the present disclosure are not limited to the vehicle control system 400 being a component of the vehicle 100, as other devices, such as a bus, boat, drone, or robot, are also contemplated for using the vehicle control system 400. In the example of FIG. 4, the vehicle system may include an acceleration control system 490. In some examples, vehicle control system 400 is configured to perform operations, including operations of the processes 300 and 500 described with reference to FIGS. 3 and 5, respectively.

The vehicle control system 400 may be implemented with a bus architecture, represented generally by a bus 440. The bus 440 may include any number of interconnecting buses and bridges depending on the specific application of the vehicle control system 400 and the overall design constraints. The bus 440 links together various circuits including one or more processors and/or hardware modules, represented by a processor 420, a communication module 422, a location module 418, a sensor module 402, a locomotion module 426, a planning module 424, and a computer-readable medium 414. The bus 440 may also link various other circuits such as timing sources, peripherals, voltage regulators, and power management circuits, which are well known in the art, and therefore, will not be described any further.

The vehicle control system 400 includes a transceiver 416 coupled to the processor 420, the sensor module 402, a comfort module 408, the communication module 422, the location module 418, the locomotion module 426, the planning module 424, and the computer-readable medium 414. The transceiver 416 is coupled to an antenna 444. The transceiver 416 communicates with various other devices over a transmission medium. For example, the transceiver 416 may receive commands via transmissions from a user or a remote device. As another example, the transceiver 416 may transmit driving statistics and information from the comfort module 408 to a server (not shown).

In one or more arrangements, one or more of the modules 402, 408, 414, 416, 418, 420, 422, 424, 426, 490, can include artificial or computational intelligence elements, such as, neural network, fuzzy logic or other machine learning algorithms. Further, in one or more arrangements, one or more of the modules 402, 408, 414, 416, 418, 420, 422, 424, 426, 490 can be distributed among multiple modules 402, 408, 414, 416, 418, 420, 422, 424, 426, 490 described herein. In one or more arrangements, two or more of the modules 402, 408, 414, 416, 418, 420, 422, 424, 426, 490 of the vehicle control system 400 can be combined into a single module.

The vehicle control system 400 includes the processor 420 coupled to the computer-readable medium 414. The processor 420 performs processing, including the execution of software stored on the computer-readable medium 414 providing functionality according to the disclosure. The software, when executed by the processor 420, causes the vehicle control system 400 to perform the various functions described for a particular device, such as the vehicle 428, or any of the modules 402, 408, 414, 416, 418, 420, 422, 424, 426, 490. The computer-readable medium 414 may also be used for storing data that is manipulated by the processor 420 when executing the software.

The sensor module 402 may be used to obtain measurements via different sensors, such as a first sensor 406 and a second sensor 404. The first sensor 406 and/or the second sensor 404 may be a vision sensor, such as a stereoscopic camera or a red-green-blue (RGB) camera, for capturing 2D images. In some examples, one or both of the first sensor 406 or the second sensor 404 may be used to identify an intersection, a crosswalk, or another stopping location. Additionally, or alternatively, one or both of the first sensor 406 or the second sensor 404 may identify objects within a range of the vehicle 100. In some examples, one or both of the first sensor 406 or the second sensor 404 may identify a pedestrian or another object in a crosswalk, such as the crosswalk 202 described with reference to FIG. 2. The first sensor 406 and he second sensor 404 are not limited to vision sensors as other types of sensors, such as, for example, light detection and ranging (LIDAR), a radio detection and ranging (RADAR), sonar, and/or lasers are also contemplated for either of the sensors 404, 406. The measurements of the first sensor 406 and the second sensor 404 may be processed by one or more of the processor 420, the sensor module 402, the comfort module 408, the communication module 422, the location module 418, the locomotion module 426, the planning module 424, in conjunction with the computer-readable medium 414 to implement the functionality described herein. In one configuration, the data captured by the first sensor 406 and the second sensor 404 may be transmitted to an external device via the transceiver 416. The first sensor 406 and the second sensor 404 may be coupled to the vehicle 428 or may be in communication with the vehicle 428.

The location module 418 may be used to determine a location of the vehicle 428. For example, the location module 418 may use a global positioning system (GPS) to determine the location of the vehicle 428. The communication module 422 may be used to facilitate communications via the transceiver 416. For example, the communication module 422 may be configured to provide communication capabilities via different wireless protocols, such as WiFi, long term evolution (LTE), 4G, etc. The communication module 422 may also be used to communicate with other components of the vehicle 428 that are not modules of the vehicle control system 400. Additionally, or alternatively, the communication module 422 may be used to communicate with an occupant of the vehicle 100. Such communications may be facilitated via audio feedback from an audio system of the vehicle 100, visual feedback via a visual feedback system of the vehicle, and/or haptic feedback via a haptic feedback system of the vehicle.

The locomotion module 426 may be used to facilitate locomotion of the vehicle 428. As an example, the locomotion module 426 may control movement of the wheels. As another example, the locomotion module 426 may be in communication with a power source of the vehicle 428, such as an engine or batteries. Of course, aspects of the present disclosure are not limited to providing locomotion via wheels and are contemplated for other types of components for providing locomotion, such as propellers, treads, fins, and/or jet engines.

The vehicle control system 400 also includes the planning module 424 for planning a route or controlling the locomotion of the vehicle 428, via the locomotion module 426. A route may be planned to a passenger based on compartment data provided via the comfort module 408. In one configuration, the planning module 424 overrides the user input when the user input is expected (e.g., predicted) to cause a collision. The modules may be software modules running in the processor 420, resident/stored in the computer-readable medium 414, one or more hardware modules coupled to the processor 420, or some combination thereof.

The acceleration control system 490 may be in communication with the sensor module 402, the transceiver 416, the processor 420, the communication module 422, the location module 418, the locomotion module 426, the planning module 424, and the computer-readable medium 414. In some examples, working in conjunction with one or more of the sensors 404, 406 and/or the sensor module 402, the acceleration control system 490 may monitoring a first current speed and a first acceleration rate of the vehicle based on the vehicle moving from a standstill. The first acceleration rate may be a current acceleration rate associated with a first time period or the initial target acceleration rate. Additionally, the acceleration control system 490 may setting an initial target acceleration rate to an adjusted target acceleration rate based on the first acceleration rate satisfying a first acceleration adjustment condition and the first current speed satisfying a second acceleration adjustment condition. In some examples, the first acceleration adjustment condition is satisfied based on the first acceleration rate being greater than an acceleration rate threshold, and the second acceleration adjustment condition is satisfied based on the first current speed being less than a speed threshold.

Furthermore, in some examples, the acceleration control system 490 may monitoring a second acceleration rate and a second current acceleration rate of the vehicle based on setting the initial target acceleration rate to the adjusted target acceleration rate. The second acceleration rate may be a current acceleration rate associated with a second time period or the adjusted target acceleration rate. Finally, the acceleration control system 490 may set the adjusted target acceleration rate to the initial target acceleration rate based on the second acceleration rate satisfying a first target acceleration condition or the second current speed satisfying a second target acceleration condition. The first target acceleration condition may be satisfied based on the second acceleration rate being less than or equal to the acceleration rate threshold, and the second target acceleration condition may be satisfied based on the second current speed being greater than or equal to the speed threshold.

Figure 5:
FIG. 5 illustrates a flow diagram for a process for adjusting an acceleration rate of a vehicle, in accordance with aspects of the present disclosure.
Figure 5:
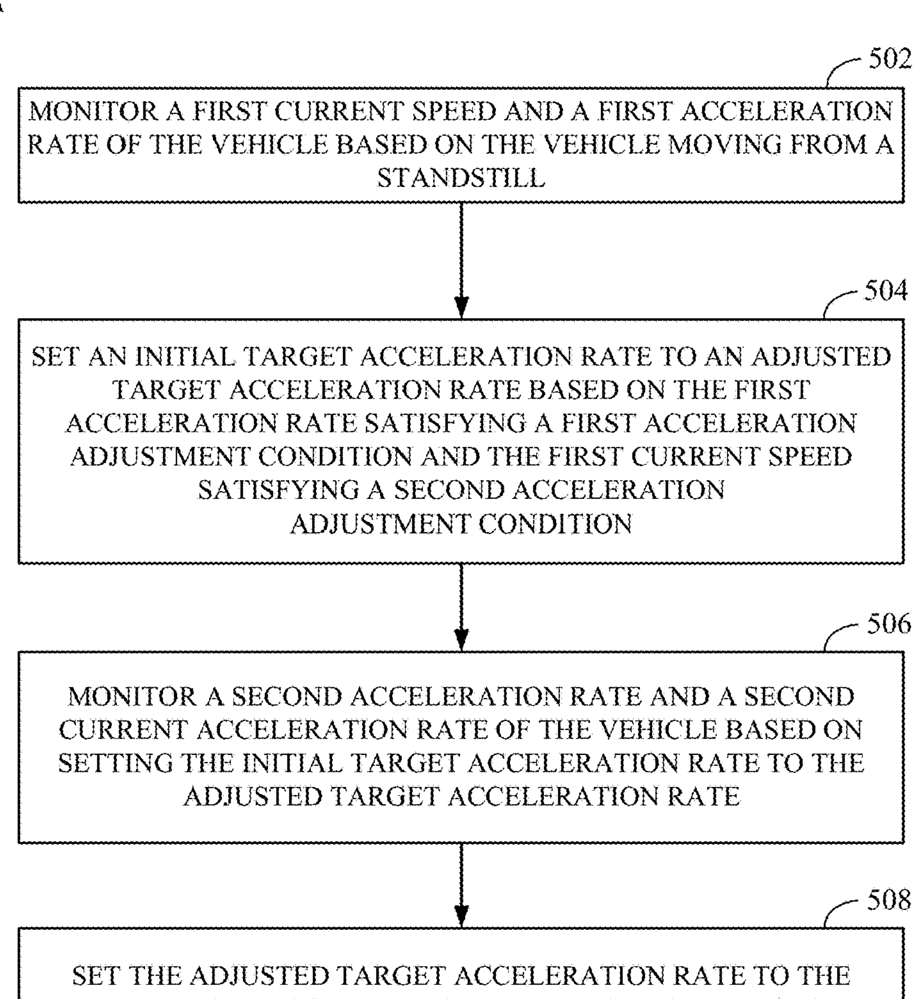

FIG. 5 illustrates a flow diagram for a process 500 for controlling an acceleration rate of a vehicle, in accordance with aspects of the present disclosure. The vehicle may be an example of a vehicle 100 described with reference to FIGS. 1, 2, and 4. In some examples, the vehicle may operate in an autonomous mode. In some such examples, the vehicle may decelerate and come to the standstill based on detecting a crosswalk, an intersection, or an object on a road. As shown in FIG. 5, the process 500 begins at block 502, by monitoring a first current speed and a first acceleration rate of the vehicle based on the vehicle moving from a standstill. In some examples, the first current speed and the first acceleration rate are monitored based on the vehicle moving from the standstill from a location within a distance from an intersection or a crosswalk. At block 504, the process 500 sets an initial target acceleration rate to an adjusted target acceleration rate based on the first acceleration rate satisfying a first acceleration adjustment condition and the first current speed satisfying a second acceleration adjustment condition. The adjusted target acceleration rate may be less than the initial target acceleration rate. Furthermore, at block 506, the process 500 monitors a second acceleration rate and a second current acceleration rate of the vehicle based on setting the initial target acceleration rate to the adjusted target acceleration rate. Finally, at block 508, the process 500 sets the adjusted target acceleration rate to the initial target acceleration rate based on the second acceleration rate satisfying a first target acceleration condition or the second current speed satisfying a second target acceleration condition.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for controlling an acceleration rate of a vehicle, comprising:

- determining, via one or more sensors associated with the vehicle, that the vehicle is at a first location, the vehicle being at a standstill at the first location, the first location is a crosswalk or an intersection;
- reducing an initial target acceleration rate of the vehicle to a first adjusted target acceleration rate in accordance with the location satisfying a first location condition;
- determining, via the one or more sensors, that the vehicle has moved from the first location to a second location;
- increasing the first adjusted target acceleration rate to a second adjusted target acceleration rate in accordance with determining the vehicle is at the second location.

2. The method of claim 1, further comprising controlling the vehicle to decelerate and come to the standstill based on detecting a stop condition associated with the first location.

3. The method of claim 2, wherein the stop condition is detected prior to the vehicle arriving at the first location.

4. The method of claim 1, wherein the second location is a location that is away from the crosswalk or the intersection.

5. The method of claim 1, wherein the vehicle operates in an autonomous mode or a semi-autonomous mode.

6. The method of claim 1, further comprising controlling the vehicle to move from the first location to the second location in accordance with detecting, while at the first location, that one or more pedestrians are not within a distance threshold of the vehicle.

7. An apparatus for controlling an acceleration rate of a vehicle, comprising:

- at least one processor; and
- at least one memory coupled with the at least one processor and storing instructions operable, when executed by the at least one processor, to cause the apparatus to:
  - determine, via one or more sensors associated with the vehicle, that the vehicle is at a first location, the vehicle being at a standstill at the first location, the first location is a crosswalk or an intersection;
  - reduce an initial target acceleration rate of the vehicle to a first adjusted target acceleration rate in accordance with the location satisfying a first location condition;
  - determine, via the one or more sensors, that the vehicle has moved from the first location to a second location; and
  - increase the first adjusted target acceleration rate to a second adjusted target acceleration rate in accordance with determining the vehicle is at the second location.

8. The apparatus of claim 7, wherein execution of the instructions further cause the apparatus to control the vehicle to decelerate and come to the standstill based on detecting a stop condition associated with the first location.

9. The apparatus of claim 8, wherein the stop condition is detected prior to the vehicle arriving at the first location.

10. The apparatus of claim 7, wherein the second location is a location that is away from the crosswalk or the intersection.

11. The apparatus of claim 7, wherein the vehicle operates in an autonomous mode or a semi-autonomous mode.

12. The apparatus of claim 7, wherein execution of the instructions further cause the apparatus to control the vehicle to move from the first location to the second location in accordance with detecting, while at the first location, that one or more pedestrians are not within a distance threshold of the vehicle.

13. A non-transitory computer-readable medium having program code recorded thereon for controlling an acceleration rate of a vehicle, the program code executed by at least one processor and comprising:

- program code to determine, via one or more sensors associated with the vehicle, that the vehicle is at a first location, the vehicle being at a standstill at the first location, the first location is a crosswalk or an intersection;
- program code to reduce an initial target acceleration rate of the vehicle to a first adjusted target acceleration rate in accordance with the location satisfying a first location condition;
- program code to determine, via the one or more sensors, that the vehicle has moved from the first location to a second location; and program code to increase the first adjusted target acceleration rate to a second adjusted target acceleration rate in accordance with determining the vehicle is at the second location.

14. The non-transitory computer-readable medium of claim 13, wherein program code further comprises program code to control the vehicle to decelerate and come to the standstill based on detecting a stop condition associated with the first location.

15. The non-transitory computer-readable medium of claim 14, wherein the stop condition is detected prior to the vehicle arriving at the first location.

16. The non-transitory computer-readable medium of claim 13, wherein the second location is a location that is away from the crosswalk or the intersection. that is away from the crosswalk or the intersection.

17. The non-transitory computer-readable medium of claim 13, wherein program code further comprises program code to control the vehicle to move from the first location to the second location in accordance with detecting, while at the first location, that one or more pedestrians are not within a distance threshold of the vehicle.

* * * * *